Aug. 12, 1930.                F. N. LLOYD                1,772,549
                            SEPARATOR PLATE
                          Filed Nov. 23, 1927
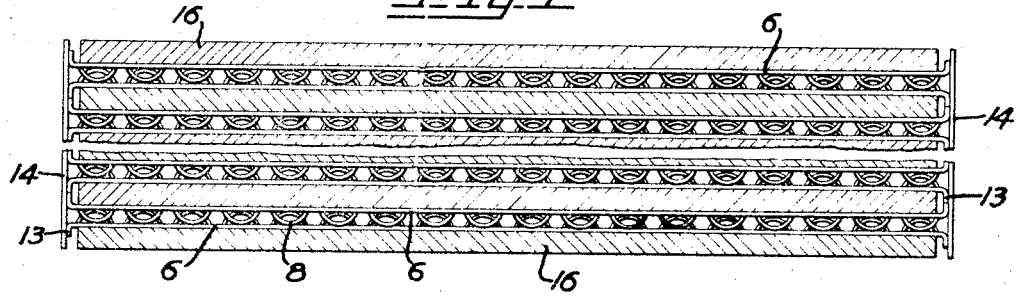
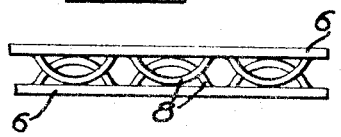 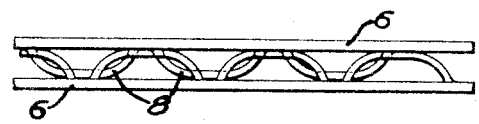
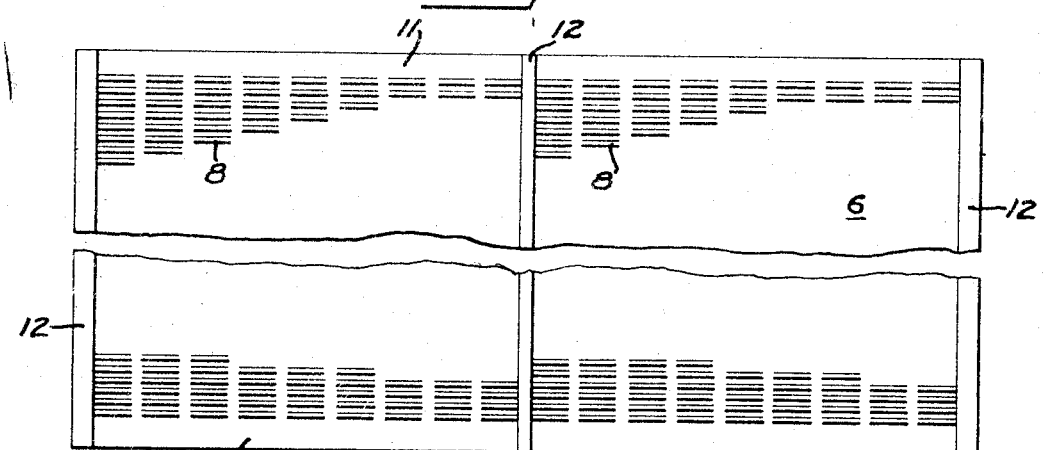
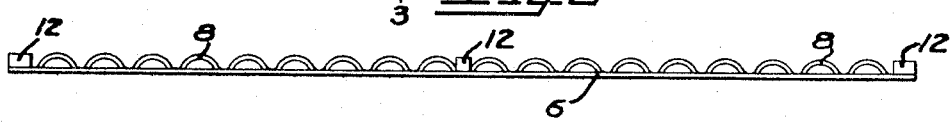
INVENTOR
FRANK N. LLOYD
BY Charles S. Evans
HIS ATTORNEY.

Patented Aug. 12, 1930

1,772,549

UNITED STATES PATENT OFFICE

FRANK N. LLOYD, OF PETALUMA, CALIFORNIA

SEPARATOR PLATE

Application filed November 23, 1927. Serial No. 235,141.

My invention relates to electric batteries, and has particular reference to secondary or storage batteries of the lead plate type.

An object of my invention is to provide a separator plate which is unaffected by the electrolyte.

Another object of my invention is to provide a separator plate which has ample and uniform porosity.

A third object of my invention is to provide a separator plate which offers maximum support to the active materials of the battery plate.

A further object is to provide a plate which is highly resistant to compressive stress.

Still another object of my invention is the production of separator plates which may readily be assembled into a self supporting unitary structure.

Still another object of my invention is to provide a separator plate having the above mentioned desirable qualities which may be produced at a cost well within practical limits.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

The primary function of the separator in a storage battery is to prevent electrical contact between the alternate positive and negative plates which it comprises. Its secondary function is to give mechanical support to the plates, tending to prevent both buckling or warping, and shedding of the active material. A separator to be practical and satisfactory must do these things without offering too great resistance to electrical currents, and it should also be unaffected by the strong acid which constitutes the electrolyte.

Referring to the drawings:

Fig. 1 is a plan view of the separator assembly as incorporated in a battery cell with the plates; and Fig. 2 is an elevation of a separator sheet showing a method of reinforcement. A portion is omitted in both views to reduce the size of the figures.

Fig. 3 is an edge view of the sheet shown in Fig. 2, taken in the direction of the arrow 3 of Fig. 2.

Fig. 4 is an edge view of a portion of two interlocked separator sheets, drawn to an enlarged scale; and Fig. 5 is a similar view showing a slightly different shape and arrangement of the interlocking parts.

Broadly considered my invention comprises the use of sheets of plastic material, such as celluloid, in which are formed a multiplicity of apertures of uniform width and spacing. The material from these apertures is not completely separated from the sheets, but remains attached thereto, being expanded out of the plane of the sheet to form a tongue which bridges the aperture. The width of the tongues is preferably equal to the spacing between them, and two such sheets may be placed with their homologous faces together, the tongues intermeshing or interlocking and retaining the sheets in spaced relation by the frictional engagement of their edges.

After assembly between the plates of a battery, retaining plates may be cemented to the edges of the separators to form a unitary structure which prevents relative movement of separators and plates.

In terms of greater detail, I prefer to make my separators as follows:

A sheet of celluloid or other plastic material 6 is heated and passed between dies or rollers comprising a multiple rolling shear. The shape of the dies is such that a plurality of rows of arch-like tongues 8 are severed from and expanded beyond the plane of the sheet, each tongue bridging the aperture formed by its creation.

The arches or tongues are uniformly spaced, and the width of each arch is substantially equal to the lateral distance between the arches. I prefer to leave a margin 9 at one edge of the sheet which is wider by the width of one arch than the margin 11 at the opposite edge. The sheets are then placed together with the arches toward each other and the wide margin of one sheet opposite the narrow margin of the other. The sheets may then be forced together, the tongues on each sheet entering the interstices between the tongues of the other and the edges of the tongues engaging frictionally.

Two arrangements of the tongues are shown in Figs. 1, 4 and 5. In Figs. 1 and 4 the rows of tongues on the two sheets are opposite each other. In Fig. 5 each row of projections on one sheet overlaps a portion of two rows on the opposed sheet, with the exception of the outermost rows, which overlap a portion of one row only. Either arrangement gives a flexible trussed plate, readily conformable to the battery plates, highly permeable to the electrolyte, and strong in compression. In either construction the crests of the arches rest against unembossed portions of the opposed sheet, thereby maintaining the sheets at a fixed distance, and supporting them at a large number of points uniformly distributed over their surfaces.

As may be seen from the drawings the rows of arches are preferably alined both vertically and horizontally, and the separators are assembled in the battery with the arches themselves horizontal. From this it results that each aperture in the separator sheet opens into an unrestricted passage from top to bottom of the cell, and that active material shedding from the plates and working thru the apertures sinks directly to the bottom and has no tendency to bridge between the plates.

In Figs. 2 and 3 reinforcing ribs 12 are shown. These ribs are preferably of the same material as the body of the separator and they may be cemented or otherwise attached to the sheets. They are not essential, but may be desirable in certain circumstances.

The separator of my invention in its preferred form as illustrated in Fig. 1 lends itself to a convenient assembly. A flange 13 is formed at the edge of each embossed sheet; and cemented to the flanges is a retainer 14. This can be done by spraying the plate 14 with a solvent such as acetone or amyl acetate, and pressing it on the flanges 13 after the battery plates 16 and the separator plates 6 are in position. If instead of a solvent, a solution of celluloid is used to coat the retaining plate 14, the flange 13 may be omitted, the cement alone making a sufficiently strong union with the separator sheets 6. If desired the sheets 6 may be sprayed with a solvent after they are intermeshed. This gives a less compressible structure.

Altho the embodiments of my invention already described are the ones that I believe to be preferable, it is obvious that many structural modifications are possible.

It is also possible to use other materials, such as rubber for the sheets. The use of the trussed plates which I have described is not limited to battery separators. Similar plates may be made of metal and used as pads under heavy machinery, where it is wished to allow some ventilation, or where temperature conditions preclude the use of rubber or felt. Many other similar uses will suggest themselves.

I claim:

1. A plate comprising a pair of opposed sheets having arched tongues expanded therefrom, said tongues meshing and interlocking the sheets by the frictional interengagement of said tongues.

2. A separator plate comprising a pair of sheets and mutually interlocking horizontal tongues on the sheets, said tongues being positioned to form unrestricted passages from top to bottom of the plate.

3. A separator plate comprising a pair of perforated sheets interlocked by interengagement of material offset in the forming of the perforations in the respective sheets.

4. A separator plate comprising a pair of opposing perforated sheets, elements integral with each sheet at points of perforation, said elements interlocking to hold the sheets together.

5. A separator plate comprising a pair of opposing sheets each sheet having a plurality of tongues with apertures underlying the tongues, the apertures of one sheet being opposite the unapertured portions of the other sheet, and the tongues being meshed.

In testimony whereof, I have hereunto set my hand.

FRANK N. LLOYD.